2,946,704
OPAQUE GLASS

Burnham W. King, Columbus, and Allison K. Smalley, Worthington, Ohio, assignors, by mesne assignments, to Union Carbide Corporation, a corporation of New York No Drawing. Filed Oct. 18, 1956, Ser. No. 616,588

8 Claims. (Cl. 117—129)

The present invention relates to an improved silicate glass, and more particularly concerns the production of an improved white, opaque, vanadate enamel.

At the present time, opaque or opalescent glasses are generally produced by the addition of substances which precipitate in colloidal form when the glass is appropriately heat treated. Substances commonly used for this purpose are fluoride salts, such as calcium fluoride. Glasses opacified in this manner are usually milky and translucent. Even the most opaque glasses of this type do not have the degree of opacity required for the applications outlined herein.

Porcelain enamels are usually opacified by additions of $TiO_2$. Relatively large quantities of $TiO_2$ are required to obtain the desired effect. In certain types of porcelain enamels, the $TiO_2$ is introduced into the raw batch, and smelted into the frit. $TiO_2$ may comprise up to 25 weight percent of these raw batches. In other types of enamels, the $TiO_2$ opacifier is added as a mill addition with the smelted enamel frit, and the mill batches may consist of from 15 to 20 weight percent of $TiO_2$. Such additions increase the difficulty of preparing the glass and the complexity of subsequent operations.

Up to now, vanadium pentoxide, $V_2O_5$, has been used occasionally to modify certain properties of silicate glass, for example, the viscosity, the surface tension and the color. However, such applications require only minor amounts of vanadium pentoxide. As far as is known, no attempts have been made to introduce vanadium pentoxide into a silica glass batch in sufficient quantities for it to act as a network former in conjunction with the silica rather than as a minor addition.

It is, therefore, an important object of the present invention to provide a siliceous glass containing significant quantities of vanadium pentoxide.

Another object of the present invention is to provide an improved white enamel containing $V_2O_5$.

Another object is to provide a lead borosilicate glass containing $V_2O_5$, and having a high degree of whiteness and opacity.

Another object of the present invention is to provide an improved borosilicate glass having as a whitening and opacifying agent, a relatively small amount of vanadium pentoxide.

Yet another object of the present invention is to provide a durable, opaque glass having a suitably low fusion temperature and a relatively high coefficient of expansion so that it may be permanently applied to metal or glass surfaces without warping.

Other objects, features and advantages of the present invention will be apparent from the following detailed description of a preferred embodiment thereof.

According to the present invention, it has been found that through the addition of a relatively small amount of vanadium pentoxide into a raw batch of glass forming material, a low fusion enamel having a high degree of whiteness and opacity may be developed.

The invention comprises incorporating in a raw batch of glass forming oxides, varying amounts of vanadium pentoxide, smelting the batch material to form a fluid glass, and quenching the glass in water to obtain an enameling frit. The frit is applied to a surface of an article and fired, the time and temperature of firing depending upon the composition of the frit and the type of surface which is being coated. The color of the prepared enameling frit depends upon the amount of vanadium pentoxide which is added, and is usually a yellow-brown. Upon firing the frit, a fused enamel frit having a high degree of whiteness and opacity is unexpectedly obtained.

While we do not wish to be bound by any particular theory, we believe the reason for the unexpectedly superior whiteness and opacity of the enamel composition of the invention resides primarily in the formation of a precipitate of an unknown vanadium complex characterized by an unusually striking, highly desirable white color and a remarkably efficient opacity. This permits the use of relatively low weight percentages of vanadium pentoxide to transform the glass frit into a white enamel, and brings about a marked reduction in light transparency. The vanadium complex is believed to become a part of the enamel in much the same manner as a suspended pigment in a paint. This is to be distinguished from conventional $TiO_2$-containing enamel compositions wherein the opacifying effect is based on the use of substantial quantities of $TiO_2$, and depends upon the recrystallization of $TiO_2$ from the molten vitreous enamel.

For the purpose of simplifying the manner of carrying out our invention, the production of enamel compositions having glass-forming oxides in certain regions of the ternary system $PbO$—$B_2O_3$—$SiO_2$ will be used in connection with the coating of glass and aluminum bases to illustrate the broad applicability of the invention. However, it is to be understood that these are presented as illustrative only, and that the principles of the invention are susceptible of application in other glass systems, and that the enameling frit of the invention may be applied to the surfaces of other materials, for example, cast iron, steel, copper, bisque and others.

Enamels embodying the principles of the invention may be formulated from a raw batch or mixture of glass-forming oxides having as principal components, PbO, $SiO_2$, and $B_2O_3$. In accordance with the invention, a small quantity of vanadium pentoxide is incorporated as a raw batch addition in the mixture. Included in the mixture may be one or more alkalies, such as $Li_2O$, $Na_2O$ and $K_2O$. In some instances the chemical stability of the enamel may be improved by the addition of small quantities of $ZrO_2$, $TiO_2$ or $Al_2O_3$, but these preferably should be limited to a total of 12% by weight of the mixture for glass enamels and 3% by weight of the mixture for aluminum enamels, in order not to impart undue refractoriness nor undesirable color to the enamel. $ZrO_2$ tends to improve the alkali resistance of the enamel, while $TiO_2$ is effective in improving the acid resistance. Other materials for enhancing the properties of the enamel of the invention may include supplementary opacifiers such as NaF and $P_2O_5$. An adherence modifier such as $Sb_2O_3$ may also be employed in aluminum-enamels.

Preferably the mixture ingredients for glass-enamel and aluminum-enamel frits should be within the following composition ranges:

| Ingredient | Broad Range, Percent | Preferred Range for Glass-Enamel Frits, Percent | Preferred Range for Aluminum Enamel Frits, Percent |
|---|---|---|---|
| PbO | 35-65 | 49-55 | 47-54 |
| $SiO_2$ | 15-40 | 23-33 | 25-33 |
| $B_2O_3$ | 1-15 | 12-15 | 1-5 |
| $V_2O_5$ | 1-15 | 3-5 | 7-10 |
| $Li_2O$ | 0-4 | 0-2 | 0-2 |
| $Na_2O$ | 0-14 | 2-4 | 4-8 |
| $K_2O$ | 0-4 | 0-2 | 0-2 |
| NaF | 0-4 | | |
| $P_2O_5$ | 0-1 | | |
| $ZrO_2$ | 0-8 | | |
| $TiO_2$ | 0-8 | | |
| $Al_2O_3$ | 0-4 | | |
| $Sb_2O_3$ | 0-0.5 | | |
| SrO | 0-1 | | |
| ZnO | 0-1 | | |
| BaO | 0-1 | | |
| CaO | 0-1 | | |
| FeO | 0-1 | | |

In preparing the enameling frit of the invention, a raw material batch falling within the above composition range is suitably sized as by comminution, preferably to a particle size less than 42 mesh size (i.e., capable of passing through screens having 0.351 mm. openings). The finely pulverized ingredients are then introduced into fireclay crucibles, and smelted to form a fluid mass of glass. Smelting may be carried out in a gas-air type furnace, or in the case of glass-enamel frits, an electric furnace, at temperatures varying from about 1800° F. to about 2000° F. for aluminum enamel frits and about 2400° F. for glass enamel frits. The smelting time may last for a period between 30 minutes and 45 minutes for aluminum enamel frits, and between 30 minutes and one hour for glass enamel frits, the time and temperature varying according to the particular composition of the mixture, and the specific surface to be enameled. The melts are then fritted by quenching in cold water, and dried. Next the frit is ball milled to a fine powder. After milling, the finely divided frit is screened to approximately 325 mesh size (0.043 mm. openings), and either made into an oil-base paste or slurried in water containing a slight amount of sodium silicate and $Na_2SiF_6$ in which condition it may be applied respectively to a glass or aluminum surface to be enameled.

If desired, the glass enameling frit may be wet milled to 325 mesh size after quenching by forming a slurry of the frit in a solution of alcohol and water. While still wet, the frit is milled in the same manner as dry milling. The frit is then dried and mixed with pine oil or other screen oil, such as Harshaw No. 570 screen oil, and thinned to the desired consistency, a slurry of paste-like consistency being particularly adaptable for application by the silk screen process.

The aluminum enameling frit may also be wet milled after quenching by forming a slurry of the frit in a solution of alcohol and water. A wet milling solution of equal proportions of water and ethyl alcohol (solid basis) together with 0.5% each sodium silicate and $Na_2SiF_6$ has been found to be admirably suited in the practice of the invention. Thereafter, the aluminum-enamel frit may be screened through a 200 mesh sieve and then thinned to the desired consistency. If the enameling frit is to be applied by spraying, the slurry may be further diluted with water to the proper consistency.

The glass-enameling frit is then coated onto a glass surface, for example, window glass, and dried at about 300° F. Preferably the enameling frit should be applied in thin layers up to about 2 mils thick. Thereafter the coated glass is fired at temperatures such that the enameling frit fuses and coalesces into a thin layer which becomes bonded to the glass surface at a temperature well below the softening temperature of the glass. Preferably the frit is fused and matured at a temperature between 1050° F. and 1250° F. for periods of from 3 minutes to 30 minutes, where the frit matures into the finished enamel coating.

The aluminum-enameling frit is usually coated by spraying onto an aluminum surface, which has been previously cleaned, as by boiling for about 5 minutes in a 5% solution of $H_2SO_4$, and dried. Preferably the aluminum-enameling frit should be applied in thin layers up to about 10 mils thick, and fired in much the same manner as glass enameling frits. Preferably the aluminum-enameling frit is fused and matured at a temperature between 1050° F. and 1200° F. for periods of from 10 minutes to 20 minutes, where the frit matures into the finished enamel coating.

The intensity of heating and the duration of heating are both critical in the production of enamel of the invention. When enameled specimens are heated at too high a temperature, or when held too long at the proper maturing temperature, they show a marked tendency to become grainy in texture, and are usually not satisfactorily opaque. This is usually accompanied by loss of adherence and darkening of color. Even when fired at temperatures well below the maturing point, the enamel may exhibit signs of "overfiring" due to excessive precipitation of the opacifying phase.

The following Table I sets forth the conditions and results of a number of typical tests wherein the application of $V_2O_5$-containing lead glasses to conventional window glass showed that smooth, opaque, and strongly adherent enamels were developed. In these tests opacity was developed in all enameling frits after heating at 1200° F. for about 10 minutes.

Table I

| Batch Composition, Weight Percent | | | | | | Smelting Temp., ° F. | Estimated Enameling Temp., ° F. |
|---|---|---|---|---|---|---|---|
| PbO | $SiO_2$ | $Na_2O$ | NaF | $B_2O_3$ | $V_2O_5$ | | |
| 40 | 40 | 7 | | 3 | 10 | 2,400 | 1,350 |
| 45 | 40 | 7 | | 3 | 5 | 2,200 | 1,250 |
| 50 | 30 | 7 | | 3 | 10 | 2,300 | 1,300 |
| 55 | 30 | 7 | | 3 | 5 | 2,100 | 1,200 |
| 65 | 20 | 7 | | 3 | 5 | 1,800 | 1,200 |
| 40 | 40 | 3 | 4 | 3 | 10 | 2,400 | 1,350 |
| 45 | 40 | 3 | 4 | 3 | 5 | 2,200 | 1,350 |
| 47 | 35 | 3 | 4 | 6 | 5 | 2,100 | 1,350 |
| 60 | 20 | 12 | | 3 | 5 | 1,800 | 1,200 |

The following Table II illustrates the evaluation of glass-enamels tested in accordance with the principles of the invention on the basis of whiteness, enamel fit, adherence, fusibility and opacity in relation to enamel thickness. In these tests the raw batch mixtures were smelted in either gas or electric type furnaces for a maximum period of about 30 minutes. The smelted batches were fritted in cold water and dried. The frits were dry milled for about 5 hours and screened through a 325 mesh sieve. The milled frits were mixed with screen oil by intensive spatulation. The resulting pastes were then applied in layer thicknesses of about 2 mils to window glass plaques by a silk screen process. The coated plaques were dried at about 300° F. prior to firing. The fired test specimens were examined with the unaided eye and with 14 diameter magnification. The chemical durability of the enamels was tested by spot tests using 10% aqueous solutions of either citric acid or NaOH at room temperature. The specimens were exposed for periods of 15 minutes. The treated specimens were evaluated by the following criteria:

(1) *Visual examination.*—The specimen was viewed at various angles, with respect to the light source and the eye, in an attempt to determine whether the treated area had an appearance different in any respect from the untreated area.

(2) *Dry-rubbing test.*—Marks extending across both treated and untreated areas were made with a No. 1 lead pencil, and the marks were then rubbed with a clean dry cloth. The specimen was inspected to determine whether the marks were retained more tenaciously on the treated than on the untreated area. If the marks were retained more tenaciously on the treated area, then the specimen failed the test.

(3) *Blurring-high light test.*—The reflected image of a sharply defined light source was made to traverse the treated and untreated surfaces of the enamel. The specimen failed the test if the image was blurred in the treated area.

(4) *Wet-rubbing test.*—The specimen was marked with a No. 1 pencil as described above, and then the marks were rubbed with a damp cloth. The specimen failed this test if the marks on the treated area were definitely more difficult to remove than those on the untreated area.

(5) *Disappearing-high light test.*—This test is similar in all respects to the blurring-high light test described above. If the image disappeared in the treated area, the specimen failed this test.

The classifications and the requirements for the respective classes of acid resistance, as established by the Porcelain Enamel Institute, are shown below. These classifications and requirements were also applied in grading the alkali resistance of the experimental enamels.

| Classification | Requirements |
| --- | --- |
| Class AA | No visible stain, and pass dry-rubbing test. |
| Class A | Pass blurring-high light test, and pass wet-rubbing test. |
| Class B | Pass blurring-high light test, and fail wet-rubbing test. |
| Class C | Fail blurring-high light test, and pass disappearing-high light test. |
| Class D | Fail disappearing-high light test. |

Glass-enamels which appeared most resistant to alkali in this test were subjected to a more rigorous exposure to alkali consisting of immersion for either 3 or 24 hours in a solution containing 8.5% NaOH and 1.5% $Na_3PO_4$. The solution temperature was maintained at 180° F.±5° F.

*Table II*

WHITE ENAMELS CONTAINING $V_2O_5$ FOR CONTAINER GLASS

| Nominal Batch Composition, Weight Percent | | | | | | | Enameling | | | Visual Evaluation of Enamels | | | Porcelain Enamel Institute Classification | | 8.5% NaOH-1.5% $Na_3PO_4$ 10% Sol., 180° F. | |
| --- | --- | --- | --- | --- | --- | --- | --- | --- | --- | --- | --- | --- | --- | --- | --- | --- |
| PbO | $SiO_2$ | $B_2O_3$ | $Na_2O$ | $V_2O_5$ | $ZrO_2$ | $TiO_2$ | Smelting Maximum Temp., °F. | Maximum Temp., °F. | Time at Max. Temp., Minutes | Degree of Maturity | Color | Enamel Fit on Window Glass | Citric Acid (10% Sol.) | NaOH (10% Sol.) | 3 Hour Exposure | 24 Hour Exposure |
| 65 | 20 | 3 | 7 | 5 | ---- | ---- | 1,800(g) | 1,200 | 10 | Good | White | Poor | ------ | ------ | -------- | |
| 65 | 20 | 6 | 4 | 5 | ---- | ---- | 1,800(g) | 1,200 | 10 | ---do--- | ---do--- | Fair | ------ | ------ | -------- | |
| 55 | 24 | 12 | 4 | 5 | ---- | ---- | 1,900(g) | 1,200 | 10 | ---do--- | ---do--- | Good | ------ | ------ | -------- | |
| 50 | 29 | 12 | 4 | 5 | ---- | ---- | 1,900(g) | 1,200 | 20 | ---do--- | ---do--- | ---do--- | ------ | ------ | -------- | |
| 55 | 26 | 12 | 4 | 3 | ---- | ---- | 1,900(g) | 1,150 | 10 | ---do--- | ---do--- | ---do--- | ------ | ------ | -------- | |
| 57 | 22 | 12 | 4 | 5 | ---- | ---- | 1,800(g) | 1,150 | 20 | ---do--- | ---do--- | ---do--- | ------ | ------ | -------- | |
| 55 | 24 | 12 | 4 | 5 | ---- | ---- | 1,850(g) | 1,200 | 10 | ---do--- | ---do--- | ---do--- | ------ | ------ | -------- | |
| 42 | 33 | 12 | 4 | 3 | 6 | ---- | 2,000(e) | 1,200 | 20 | Slightly Underfired. | ---do--- | ---do--- | B | AA | Etched | Matrix Dissolved. |
| 40 | 33 | 12 | 4 | 3 | ---- | 8 | 2,000(e) | 1,200 | 20 | Underfired. | Cream | ---do--- | B | AA | Severely Etched. | |

(g) Gas-air type furnace.
(e) Electric type furnace.

The following Table III sets forth the conditions and results of a number of typical tests wherein the application of $V_2O_5$-containing lead glasses to aluminum plaques showed that smooth, opaque, and strongly adherent enamels were developed. In these tests opacity was developed in all enameling frits after heating at 1150° F. for about 10 minutes. The enamels were evaluated on the basis of whiteness, enamel fit, adherence, fusibility and opacity in relation to enamel thickness. The raw batch mixtures were smelted in gas-air type furnaces for a period of about 30 minutes. The smelted batches were fritted in cold water and wet milled for about 5 hours. The milled frits were then applied to aluminum plaques by spraying. The coated plaques were dried prior to firing. The test specimens of aluminum-enamels were examined and evaluated in the same manner as the previously described glass-enamel specimens.

*Table III*

WHITE ENAMELS CONTAINING $V_2O_5$ FOR ALUMINUM

| PbO | $SiO_2$ | $B_2O_3$ | $Na_2O$ | $V_2O_5$ | $TiO_2$ | $ZrO_2$ | Smelting Maximum Temp., °F. | Visual Evaluation of Fired Enamels | | | | Chemical Resistance of Enamels, PEI Classification | |
| --- | --- | --- | --- | --- | --- | --- | --- | --- | --- | --- | --- | --- | --- |
| | | | | | | | | Degree of Maturity | Color | Adherence | Fit | Citric Acid | NaOH |
| 54 | 25 | 3 | 8 | 8 | 2 | ---- | 1,800 | Good | White | Good | Good | A | A |
| 54 | 25 | 3 | 8 | 8 | ---- | 2 | 1,800 | ---do--- | ---do--- | ---do--- | ---do--- | A | A |
| 52 | 29 | 3 | 8 | 8 | ---- | 2 | 2,100 | Very Slightly Underfired. | ---do--- | ---do--- | Fair | A | A |
| 52.5 | 27 | 3 | 8 | 8 | 0.5 | 1.0 | 2,100 | ---do--- | ---do--- | ---do--- | Good | A | A |
| 50 | 31 | 3 | 8 | 8 | ---- | ---- | ¹2,150 | Good | ---do--- | ---do--- | ---do--- | A | A |
| 48 | 33 | 3 | 8 | 8 | ---- | ---- | ¹2,150 | ---do--- | ---do--- | ---do--- | ---do--- | A | A |
| 51 | 29 | 3 | 8 | 8 | 0.5 | 0.5 | ¹2,150 | ---do--- | ---do--- | ---do--- | ---do--- | A | A |
| 49 | 31 | 3 | 8 | 8 | 0.5 | 0.5 | ¹2,150 | ---do--- | ---do--- | ---do--- | ---do--- | A | A |
| 47 | 33 | 3 | 8 | 8 | 0.5 | 0.5 | ¹2,150 | ---do--- | ---do--- | ---do--- | ---do--- | A | A |

¹ Smelted for 45 minutes.

From the above results it will be seen that enamels embodying the principles of the invention possess optimum balance between adherence, whiteness, opacity and resistance to chemical attack. Having excellent fit characteristics on window glass and aluminum, enamels of the invention exhibit remarkably low temperature fusibility, the more promising enameling frits maturing as low as 1050° F.

One of the important advantages of the present invention is the unexpectedly high degree of whiteness and opacity which may be developed in a lead glass on the addition of a relatively small amount of vanadium pentoxide. Having a low-fusion temperature, enamels of this type are admirably suited in the decoration of glass or aluminum ware, which requires a maturing temperature no higher than about 1200° F. In addition, the present enamel possesses a coefficient of expansion close to that of either glass or aluminum, making it even more useful as an enamel coating for glass or aluminum articles. Because they are exceptionally adherent, these enamels have good fitting characteristics on window glass and aluminum. They are white and opaque in thicknesses as low as 1 mil. It has further been found that with the vanadium pentoxide containing enamel, the major hiding power or opacity of the enamel coating is obtained rather sharply with initial increments of coating thickness, and that with increasing thickness the quality of opacity is improved. The preferred coating thickness is at least about 2 mils, although smaller or larger thicknesses may be used. Enameled specimens of the invention reveal no evidence of crazing under 14 diameter magnification. Because of the relatively small amounts of $V_2O_5$ required to achieve the remarkable whiteness, opacity and other beneficial properties, enamels of the invention have been found to be vastly superior over similar enamels containing titanium dioxide. Enamel compositions of the subject invention are simple and inexpensive to manufacture.

From the above description it will be seen that an enamel having a high degree of whiteness and opacity, as well as a host of other beneficial properties may be developed in a lead glass on the addition of $V_2O_5$.

It will be understood that modifications and variations may be effected without departing from the spirit and scope of the present invention. For example, other vanadium compounds such as $V_2O_3$ or ammonium vanadate, which can be converted to $V_2O_5$ during the smelting operation or other heat treatment could likewise be used as the whitening and opacifying agent in accordance with the principles of the invention.

What is claimed is:

1. An enamel body having a high degree of whiteness and opacity consisting of 35% to 65% PbO, 15% to 40% $SiO_2$, 1% to 15% $B_2O_3$, 1% to 15% $V_2O_5$, 0% to 14% of at least one alkali selected from the group consisting of $Li_2O$, $Na_2O$ and $K_2O$, and 0% to 8% of at least one stabilizer from the group consisting of $ZrO_2$, $TiO_2$ and $Al_2O_3$.

2. An enameling frit for glass consisting of 49% to 55% PbO, 23% to 33% $SiO_2$, 12% to 15% $B_2O_3$, 3% to 5% $V_2O_5$, 0% to 2% $Li_2O$, 2% to 4% $Na_2O$, and 0% to 2% $K_2O$, said frit being characterized by a low fusion point and capable of maturing into a white, opaque enamel upon heat treatment.

3. An aluminum-enameling frit for the production of an enamel having a high degree of whiteness and opacity consisting of 47% to 54% PbO, 25% to 33% $SiO_2$, 1% to 5% $B_2O_3$, 7% to 10% $V_2O_5$, 0% to 2% $Li_2O$, 4% to 8% $Na_2O$ and 0% to 2% $K_2O$.

4. A method of producing a white, opaque enamel coating on a surface comprising pulverizing an enameling frit consisting essentially of from 35 to 65 percent by weight PbO, from 15 to 40 percent by weight $SiO_2$, from 1 to 15 percent by weight $B_2O_3$, from 1 to 15 percent by weight $V_2O_5$, up to 14 percent by weight of at least one alkali selected from the group consisting of $Li_2O$, $Na_2O$, $K_2O$, and up to 8 percent by weight of at least one stabilizer selected from the group consisting of $ZrO_2$, $TiO_2$, and $Al_2O_3$, applying said frit on the surface to be coated, and firing it at a temperature between about 1050° F. and about 1350° F. to obtain an enamel coating.

5. A method of producing a white, opaque enamel coating on a glass surface comprising pulverizing an enameling frit consisting essentially of from 49 to 55 percent by weight PbO, from 23 to 33 percent by weight $SiO_2$ from 12 to 15 percent by weight $B_2O_3$, from 3 to 5 percent by weight $V_2O_5$, up to 2 percent by weight $Li_2O$, from 2 to 4 percent by weight $Na_2O$, and up to 2 percent by weight $K_2O$, applying said frit on said glass surface and firing it at a temperature between about 1050° F. and 1250° F. for from about 3 to about 30 minutes to obtain an enamel coating.

6. A method of producing a white, opaque enamel coating on an aluminum surface comprising pulverizing an enameling frit consisting essentially of from 47 to 54 percent by weight PbO, from 25 to 33 percent by weight $SiO_2$, from 1 to 5 percent by weight $B_2O_3$, from 7 to 10 percent by weight $V_2O_5$, up to 2 percent by weight $Li_2O$, from 4 to 8 percent by weight $Na_2O$, and up to 2 percent by weight $K_2O$, applying said frit on the aluminum surface to be coated and firing it at a temperature between about 1050° F. and about 1200° F. for from about 10 to about 20 minutes to obtain an enamel coating.

7. A method of producing a white, opaque enamel coating on a surface comprising pulverizing a low fusion temperature lead-borosilicate glass frit containing from about 1 to about 15 percent by weight vanadium pentoxide, applying said frit on the surface to be coated, and firing it at a temperature between about 1050° F. and 1350° F. to obtain an enamel coating.

8. A method of producing a white, opaque enamel coating on a cast iron surface comprising pulverizing a frit consisting essentially of from 35 to 65 percent by weight PbO, from 15 to 40 percent by weight $SiO_2$, from 1 to 15 percent $B_2O_3$, from 1 to 15 percent by weight $V_2O_5$, up to 14 percent by weight of at least one alkali selected from the group consisting of $ZrO_2$, $TiO_2$, and $Al_2O_3$, applying said frit on the cast iron surface to be coated, and firing it at a temperature between about 1050° F. and about 1350° F. to obtain an enamel coating.

References Cited in the file of this patent

UNITED STATES PATENTS

| | | |
|---|---|---|
| 2,084,747 | Rosenberg | June 22, 1937 |
| 2,394,493 | Schoenlaub | Feb. 5, 1946 |
| 2,417,898 | Armistead | Mar. 25, 1947 |
| 2,599,349 | Ricker | June 3, 1952 |
| 2,642,364 | Beatly et al. | June 16, 1953 |
| 2,653,877 | Deyrup | Sept. 29, 1953 |
| 2,734,142 | Barnes | Feb. 7, 1956 |
| 2,829,062 | Bennett et al. | Apr. 1, 1958 |